US012279162B2

(12) United States Patent
Chen et al.

(10) Patent No.: US 12,279,162 B2
(45) Date of Patent: Apr. 15, 2025

(54) HANDLING OF UE IN CM-CONNECTED STATE WITH RRC INACTIVE STATE

(71) Applicant: Telefonaktiebolaget LM Ericsson (publ), Stockholm (SE)

(72) Inventors: Qian Chen, Mölndal (SE); Gunnar Mildh, Sollentuna (SE); Hans Bertil Rönneke, Kungsbacka (SE); Patrik Rugeland, Stockholm (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 518 days.

(21) Appl. No.: 17/618,617

(22) PCT Filed: Jun. 12, 2020

(86) PCT No.: PCT/IB2020/055540
§ 371 (c)(1),
(2) Date: Dec. 13, 2021

(87) PCT Pub. No.: WO2020/250198
PCT Pub. Date: Dec. 17, 2020

(65) Prior Publication Data
US 2022/0256407 A1 Aug. 11, 2022

Related U.S. Application Data

(60) Provisional application No. 62/860,603, filed on Jun. 12, 2019.

(51) Int. Cl.
*H04W 36/00* (2009.01)
*H04W 40/36* (2009.01)

(52) U.S. Cl.
CPC ... *H04W 36/0022* (2013.01); *H04W 36/0033* (2013.01); *H04W 40/36* (2013.01)

(58) Field of Classification Search
CPC ... H04W 8/08; H04W 36/0033; H04W 40/36; H04W 36/0022; H04W 36/144;
(Continued)

(56) References Cited

U.S. PATENT DOCUMENTS

| 2003/0139182 A1* | 7/2003 | Bakkeby | H04W 8/06 455/432.1 |
| 2019/0104447 A1* | 4/2019 | Horn | H04W 36/0038 |

(Continued)

OTHER PUBLICATIONS

Author Unknown, "Technical Specification Group Services and System Aspects; General Packet Radio Service (GPRS) enhancemnets for Evolved Universal Terrestrial Radio Access Network (E-UTRAN) access (Release 16)," Technical Specification 23.401, Version 16.2.0, Mar. 2019, 3GPP Organizational Partners, 418 pages.
(Continued)

*Primary Examiner* — Allahyar Kasraian
(74) *Attorney, Agent, or Firm* — Sage Patent Group

(57) ABSTRACT

Systems and methods for handling a wireless device in a Configuration Management (CM)-Connected state with Radio Resource Control (RRC) Inactive state are provided. In some embodiments, a method for performing a mobility transfer from a Fifth Generation network to an Evolved Packet System (EPS) network includes a 5G network node: receiving, from an EPS network node, a context request for context associated with a User Equipment (UE); determining data forwarding information associated with the UE; and sending, to the EPS network node, a context response comprising context information associated with the UE and data forwarding information associated with the UE. In this way, packet losses will be minimized leading to improved end user performance.

11 Claims, 15 Drawing Sheets

(58) Field of Classification Search
CPC ....... H04W 36/0066; H04W 36/00222; H04W 36/125; H04W 36/0055
See application file for complete search history.

(56) References Cited

U.S. PATENT DOCUMENTS

| | | | | |
|---|---|---|---|---|
| 2019/0182876 | A1* | 6/2019 | Ying | H04W 36/0033 |
| 2019/0335534 | A1* | 10/2019 | Atarius | H04L 65/1016 |
| 2020/0178139 | A1* | 6/2020 | Shimojou | H04W 92/24 |
| 2020/0367190 | A1* | 11/2020 | Wang | H04W 60/04 |
| 2021/0289402 | A1* | 9/2021 | Ke | H04W 36/0033 |
| 2022/0046508 | A1* | 2/2022 | Xu | H04W 36/144 |
| 2022/0095260 | A1* | 3/2022 | Shan | H04W 12/06 |

OTHER PUBLICATIONS

Author Unknown, "Technical Specification Group Services and System Aspects; System Architecture for the 5G System; Stage 2 (Release 16)," Technical Specification 23.501, Version 16.0.2, Apr. 2019, 3GPP Organizational Partners, 317 pages.

Author Unknown, "Technical Specification Group Services and System Aspects; Procedures for the 5G System; Stage 2 (Release 16)," Technical Specification 23.502, Version 16.0.2, Apr. 2019, 3GPP Organizational Partners, 419 pages.

Author Unknown, "Technical Specification Group Services and System Aspects; Procedures for the 5G System; Stage 2 (Release 16)," Technical Specification 23.502, Version 16.1.1, Jun. 2019, 3GPP Organizational Partners, 495 pages.

Author Unknown, "Technical Specification Group Services and System Aspects; Study on Cellular Internet of Things (CIoT) support and evolution for the 5G System (5GS) (Release 16)," Technical Report 23.724, Version 16.1.0, Jun. 2019, 3GPP Organizational Partners, 274 pages.

Author Unknown, "Technical Specification Group Core Network and Terminals; Non-Access-Stratum (NAS) protocol for Evolved Packet System (EPS); Stage 3 (Release 15)," Technical Specification 24.301, Version 15.5.0, Dec. 2018, 3GPP Organizational Partners, 536 pages.

Author Unknown, "Technical Specification Group Core Network and Terminals; 5G System; Session Management Services; Stage 3 (Release 15)," Technical Specification 29.502, Version 15.3.0, Mar. 2019, 3GPP Organizational Partners, 140 pages.

Author Unknown, "Technical Specification Group Radio Access Network; NG-RAN; NG Application Protocol (NGAP) (Release 15)," Technical Specification 38.413, Version 15.3.0, Mar. 2019, 3GPP Organizational Partners, 319 pages.

Ericsson, "S2-1907494: 5GS to EPS Idle mode mobility with N26 interface with RRC inactive and data," 3GPP TSG-SA WG2 Meeting #134, Jun. 24-28, 2019, Sapporo, Japan, 4 pages.

Qualcomm Incorporated, "S2-188145: Evaluation for small data optimization with RAN context: 5G UP optimization vs CM-Connected with RRC inactive with data buffering at CN," 3GPP SA WG2 Meeting #128-BIS, Aug. 20-24, 2018, Sophia-Antipolis, France, 23 pages.

International Search Report and Written Opinion for International Patent Application No. PCT/IB2020/055540, mailed Sep. 4, 2020, 18 pages.

* cited by examiner

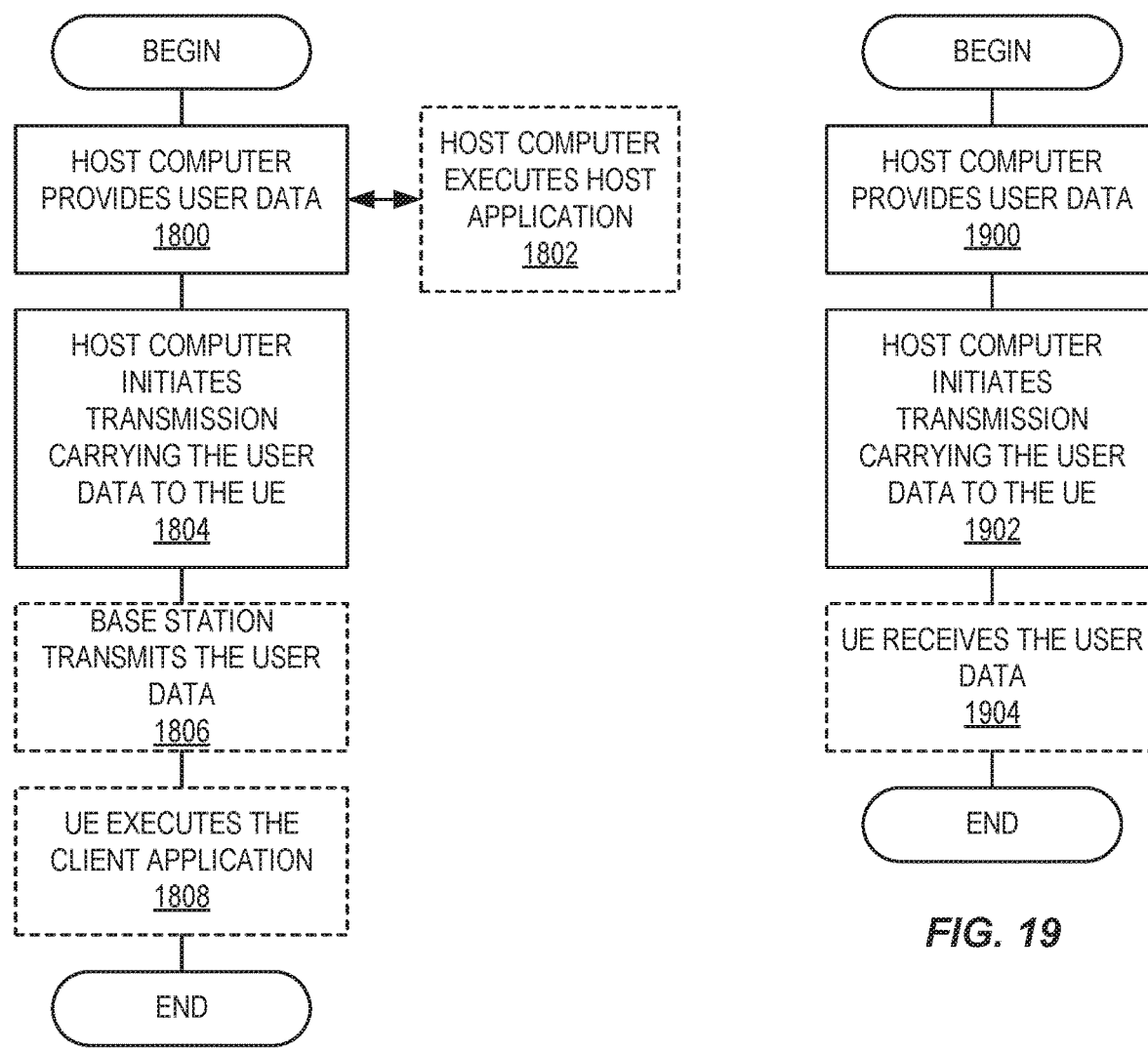

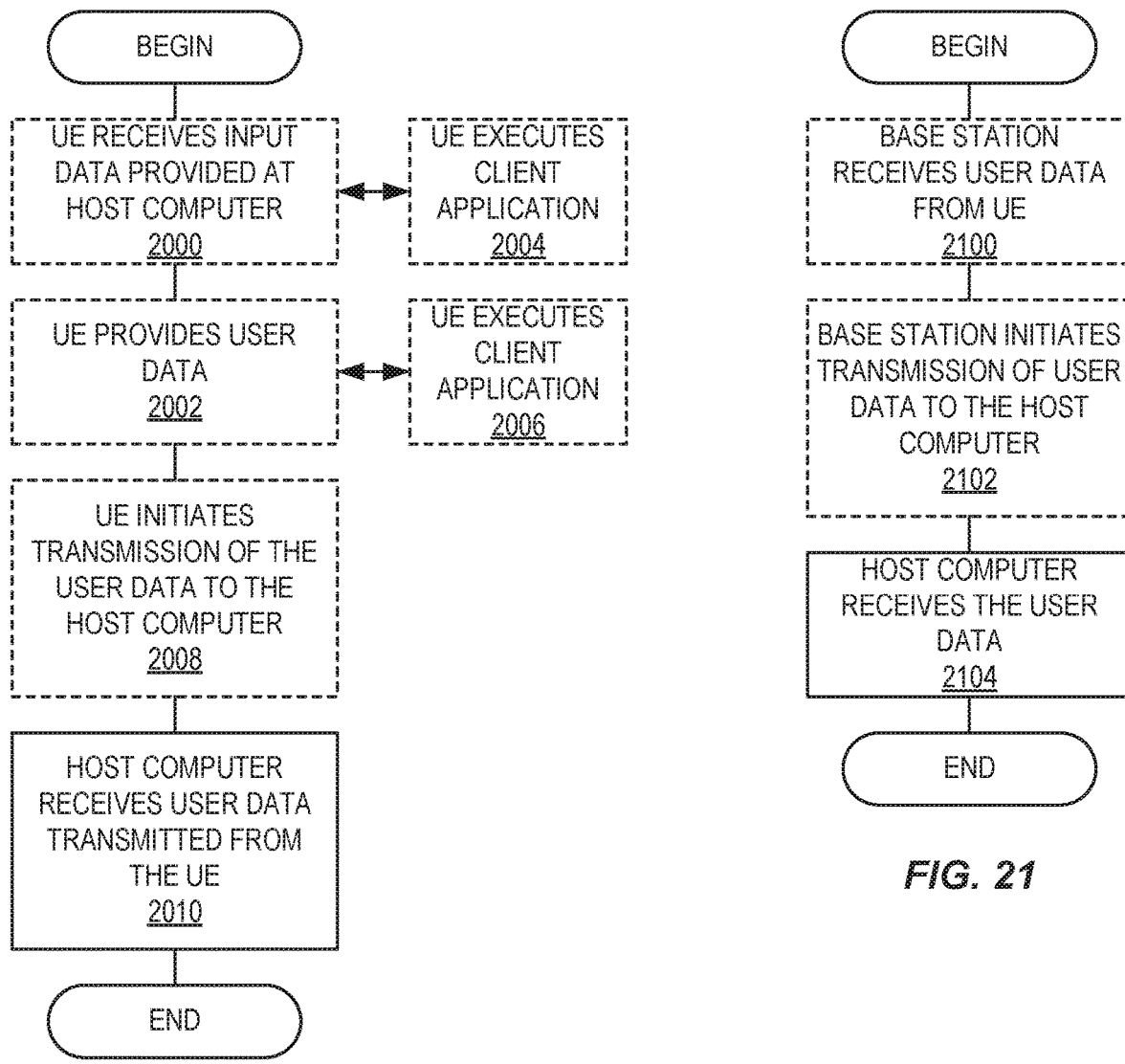

ial Application No. PCT/IB2020/055540, filed
HANDLING OF UE IN CM-CONNECTED STATE WITH RRC INACTIVE STATE

RELATED APPLICATIONS

This application is a 35 U.S.C. § 371 national phase filing of International Application No. PCT/IB2020/055540, filed Jun. 12, 2020, which claims the benefit of provisional patent application Ser. No. 62/860,603, filed Jun. 12, 2019, the disclosures of which are hereby incorporated herein by reference in their entireties.

TECHNICAL FIELD

The present disclosure relates to the operation of a wireless device in an inactive state.

BACKGROUND

The Third Generation Partnership Project (3GPP) has decided to introduce both a new Fifth Generation (5G) Core network (5GC) and a new Radio Access Technology (RAT), called New Radio (NR), in the 5G System (5GS). However, the core network, 5GC, will also support other RATs than NR, namely Evolved Universal Terrestrial Radio Access (E-UTRA).

FIG. 1 shows the network architecture for the Evolved Packet System (EPS) and 5GS, showing an Evolved Universal Terrestrial Radio Access Network (E-UTRAN) comprising Long Term Evolution (LTE) nodes, i.e., Enhanced or Evolved Node Bs (eNBs) connected to the Evolved Packet Core (EPC), and a Next Generation (NG) Radio Access Network (RAN), NG-RAN, comprising LTE nodes (e.g., NG-eNB) and NR nodes (e.g., New Radio Base Station (gNB)) connected to the 5GC.

The LTE node connected to EPC (LTE/EPC) can be interconnected with the X2 interface, while the NG-RAN nodes (NR and LTE/5GC) can be interconnected with the Xn interface. 3GPP has also introduced an interface, called N26, between the Mobility Management Entity (MME) in EPC and the Access and Mobility Management Function (AMF) in 5GC, which enables interworking between the EPC and the 5GC.

FIG. 2 illustrates the state transitions currently supported in LTE (E-UTRA) connected to EPC or 5GC and NR. As can be seen it is possible to move ongoing User Equipment (UE) connection (UE is in RRC_CONNECTED) between the two RATs using handover procedure. Additionally, (not shown) it is possible for the network to move the UE to the other RAT by sending a Release message with re-direct information. When the UE is in Radio Resource Control (RRC) IDLE or RRC INACTIVE state the cell reselection procedure will be used when transitioning between the RATs.

In addition, FIG. 2 shows the new RRC state RRC_INACTIVE introduced in Release (Rel-) 15 for both NR and LTE/5GC. In RRC_INACTIVE, the UE stores certain configurations, e.g., Data Radio Bearer (DRB) configurations and physical layer parameters. When the UE needs to resume the connection, it transmits an RRCConnectionResumeRequest or RRCResumeRequest in LTE and NR, respectively. The UE can then reuse the stored settings and reduce the time and signaling needed to properly operate in RRC_CONNECTED (as in the RRC_INACTIVE state security and Core Network (CN) connection are restored upon resume).

Note: In NR an equivalent message exists for the case of long RRC_INACTIVE mode Radio Network Temporary Identifier (I-RNTI) of 40 bits used as UE identifier RRCResumeRequest1, associated to a different logical channel compared to the short I-RNTI used in the RRCResumeRequest message.

In Rel-15 (first release) of the NG-RAN standard, it has been agreed to not support direct transition between RRC_INACTIVE in LTE/5GC and RRC_INACTIVE in NR. Hence, a Rel-15 UE in the RRC_INACTIVE state in one RAT performing cell reselection to the other RAT would trigger the UE to release its AS context, enter RRC_IDLE and perform a mobility registration update/tracking area update.

Inter-system RAN Notification Area: It has been proposed to configure a UE with a RAN Notification Area (RNA) comprising both LTE/EPC an NR cells, so that the UE can freely re-select between the cells without signaling anything to the network. If the UE re-selects an LTE/EPC cell within the UE specific RNA, the UE would remain in the RRC_INACTIVE state. If the UE needs to connect to the network while camping on an LTE/EPC cell, it enters RRC_IDLE and triggers a Tracking Area Update (TAU) in EPC.

To ensure reachability of the UE even when the UE was camping in LTE/EPC, RAN paging was proposed to be introduced for X2, so that if the UE is paged in an LTE/EPC cell while in the RRC_INACTIVE state, it would enter the RRC_IDLE state and trigger a TAU in the EPC.

Even in the case when an RNA only includes NR cells, the UE can also enter to an LTE/EPC cell and trigger a TAU towards the EPC.

Tracking Area Update (TAU): When a UE enters a cell which does not belong to its configured Tracking Area Identity (TAI) List and the UE connects to the EPC, this will trigger a Non-Access Stratum (NAS) TAU, by transmitting a TRACKING AREA UPDATE REQUEST (shown below from the 3GPP Technical Specification (TS) 24.301, Version 15.5.0) to the target MME, which can respond with a TRACKING AREA UPDATE Accept. In NR, a similar procedure is defined, called mobility registration update, where the UE instead sends a REGISTRATION UPDATE REQUEST.

There currently exist certain challenges. In RRC_INACTIVE state, at least one PDU Session has user plane resources, i.e., a N3 General Packet Radio Service (GPRS) Tunneling Protocol (GTP) User Plane (GTP-U) tunnel between the UPF terminating the N6 and the NG-RAN terminating the N3 as well as associated DRBs established. This implies that any Mobile Terminated (MT) data is buffered or forwarded in or to NG-RAN and the AMF is unaware of that situation.

The NAS entity in the AMF and in the UE is in the Configuration Management (CM)-CONNECTED state. If the UE that is in the RRC_INACTIVE state moves from 5GS to EPS, the UE will perform a Tracking Area Update procedure that moves the UE Context from the old AMF to the new MME. However, there is no mechanism describing how user plane resources are managed. In scenarios where a UE is configured with an RNA comprising both LTE/EPC an NR cells, for example, there are no means to forward the data triggering the RAN paging in old NG-RAN to the UE connected to the eNB in EPS.

SUMMARY

Systems and methods for handling a wireless device in a CM-Connected state with RRC Inactive state are provided. In some embodiments, a method for performing a mobility transfer from a Fifth Generation (5G) network to an Evolved Packet System (EPS) network includes a 5G network node: receiving, from an EPS network node, a context request for context associated with a User Equipment (UE); determining data forwarding information associated with the UE; and sending, to the EPS network node, a context response comprising context information associated with the UE and data forwarding information associated with the UE. In this way, packet losses will be minimized leading to improved end user performance.

In some embodiments, at a UE Context transfer from the old AMF to the new MME triggered by TAU request in EPS and if the UE state in the AMF is the CM-CONNECTED state, the AMF provides the MME with information about the need to establish EPS Bearers that can serve the PDU Sessions that are subject to transfer to EPS based on the information retrieved from NG-RAN and SMF. The AMF and MME also communicate the data forwarding tunnel info for possible data forwarding between NG-RAN to E-UTRAN. The MME realizes the need of user plane resource setup based on the indication from AMF in GTPv2 Context Response.

In some embodiments, the 5G network node comprises an Access and Mobility Management Function (AMF). In some embodiments, the EPS network node comprises a Mobility Management Entity (MME).

In some embodiments, the context request comprises current UE location information. In some embodiments, the current UE location information comprises at least one of: a current Tracking Area Identity (TAT); and an Evolved Universal Terrestrial Radio Access Network (E-UTRAN) Cell Global identifier (eCGI).

In some embodiments, determining NG the data forwarding information associated with the UE comprises: receiving an indication from a Session Management Function (SMF) regarding data forwarding information associated with the UE.

In some embodiments, determining the data forwarding information comprises: sending, to a 5G Node B (gNB) within the NG-RAN, a first request for data forwarding information associated with the UE; receiving, from the gNB, a first response comprising data forwarding information associated with the UE; sending, to a SMF and/or a User Plane Function (UPF) a second request for bearer context information associated with the UE, the second request comprising the data forwarding information associated with the UE; and receiving, from the SMF and/or UPF, a second response comprising the bearer context information associated with the UE, a buffered download data waiting indication associated with the UE, and a direct or indirect forwarding indication associated with the UE; and wherein sending the data forwarding information comprises sending the buffered download data waiting indication and the direct or indirect forwarding indication.

In some embodiments, the first request comprises a N2 Data Forwarding Information Request message and the first response comprises a N2 Data Forwarding Information Response message. In some embodiments, the data forwarding information associated with the UE comprises at least one of: a Protocol Data Unit (PDU) session Identifier (ID) having buffered data; a direct or indirect forwarding indication; and information identifying a forwarding container.

In some embodiments, the second request comprises a Nsmf_PDUSessionContext Request message and the second response comprises a Nsmf_PDUSessionContext Response message.

In some embodiments, direct forwarding is indicated by the presence of a direct forwarding indicator in the second response and wherein indirect forwarding is indicated by the absence of a direct forwarding indicator in the second response.

In some embodiments, the method also includes receiving, from the EPS node, a context acknowledgment that comprises General Packet Radio Service (GPRS) Tunneling Protocol (GTP) User Plane (GTP-U) tunnel information; and sending the GTP-U tunnel information to the NG-RAN. In some embodiments, receiving the GTP-U tunnel information comprises receiving a forwarding Fully-qualified Tunnel Endpoint Identifier (F-TEID). In some embodiments, sending the GTP-U tunnel information to the NG-RAN comprises sending an N2 Forwarding Information Request message comprising the GTP-U tunnel information.

In some embodiments, a method for performing a mobility transfer from a 5G network to an EPS network includes an EPS network node: sending, to a 5G network node, a context request for context associated with a User Equipment (UE); receiving, from the 5G network node, a context response comprising context information associated with the UE and also data forwarding information associated with the UE; and upon determining that data forwarding is needed for the UE, providing, to the 5G network node, GTP-U tunnel information for forwarding data from the 5G network to the EPS network.

In some embodiments, a method for performing a mobility transfer from a 5G network to an EPS network, the method including a NG RAN node: receiving, from a 5G network node, a request for data forwarding information associated with a UE; and sending, to the 5G network node, a response comprising data forwarding information associated with the UE.

In some embodiments, a method for performing a mobility transfer from a 5G network to an EPS network, the method includes a first 5G network node: receiving, from a second 5G network node, a request for bearer context information associated with the UE; and sending, to second 5G network node, a response comprising the bearer context information associated with the UE and a buffered download data waiting indication associated with the UE.

Certain embodiments may provide one or more of the following technical advantage(s). This solution enables the EPS Bearer setup required for downlink data forwarding when the UE performs a TAU request at idle mode mobility towards an EPS and there is data available at the source system. In this way packet losses will be minimized leading to improved end user performance.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 15 through 18 are flow charts illustrating methods implemented in a communication system, according to some embodiments of the present disclosure; and FIGS. 19 through 21 depict flowcharts illustrating some methods implemented in a communication system, according to some embodiments of the present disclosure.

DETAILED DESCRIPTION

Figure 1:
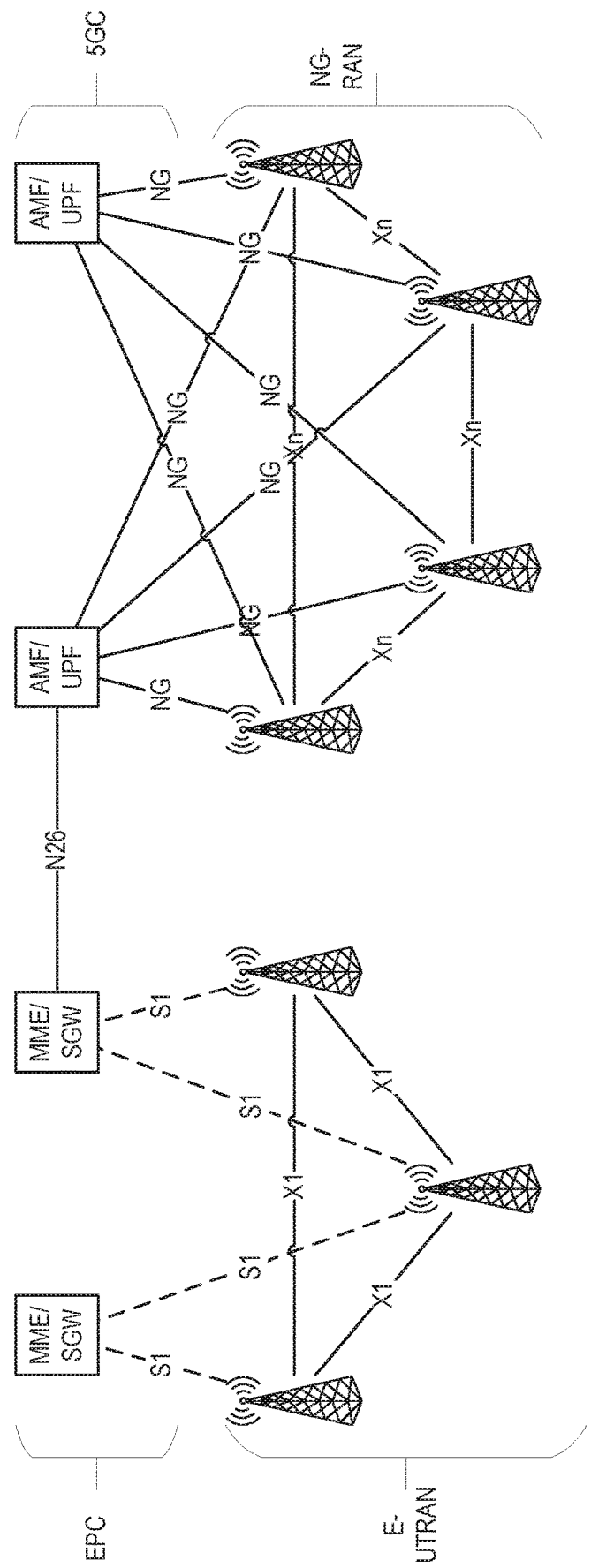
FIG. 1 shows the network architecture for the Evolved Packet System (EPS) and 5GS, showing an Evolved Universal Terrestrial Radio Access Network (E-UTRAN) comprising Long Term Evolution (LTE) nodes, i.e., Enhanced or Evolved Node Bs (eNBs) connected to the Evolved Packet Core (EPC), and a Next Generation (NG) Radio Access Network (RAN), NG-RAN, comprising LTE nodes (e.g., NG-eNB) and NR nodes (e.g., New Radio Base Station (gNB)) connected to the 5GC.
Figure 2:
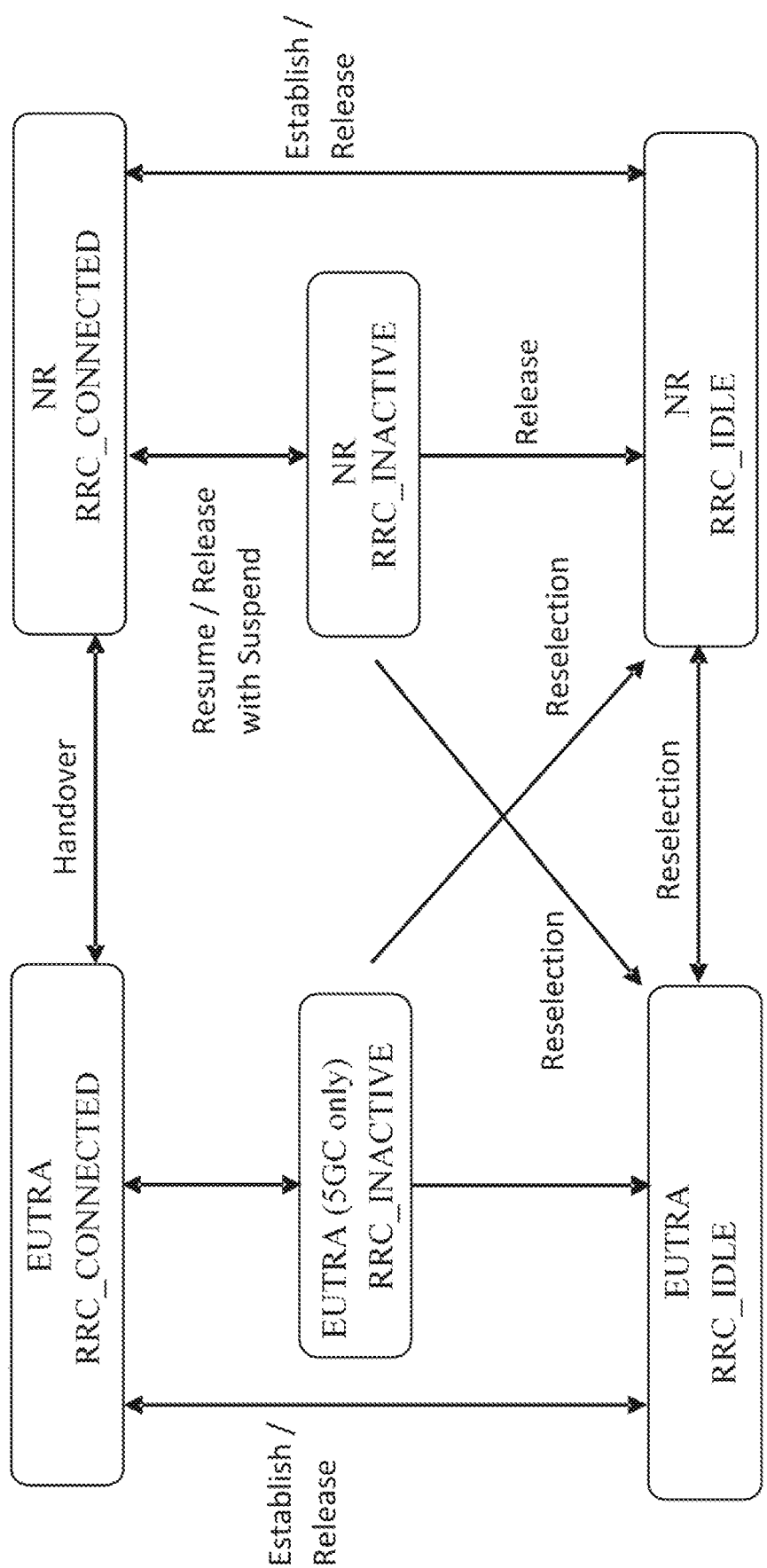
FIG. 2 illustrates the state transitions currently supported in LTE (E-UTRA) connected to EPC or 5GC and NR.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node, including a server or a data center, in a core network that implements a core network function. Some examples of a 4G (EPC) core network function implemented on a node include, e.g., a Mobility Management Entity (MME), a Packet Data Network Gateway (PGW), a Service Capability Exposure Function (SCEF), a Home Subscriber Server (HSS), or the like. Examples of 5G core network function an Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like. The Core network functions may be virtualized/containerized on the node or implemented on-premise using a dedicated physical node (compute, memory, and network).

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
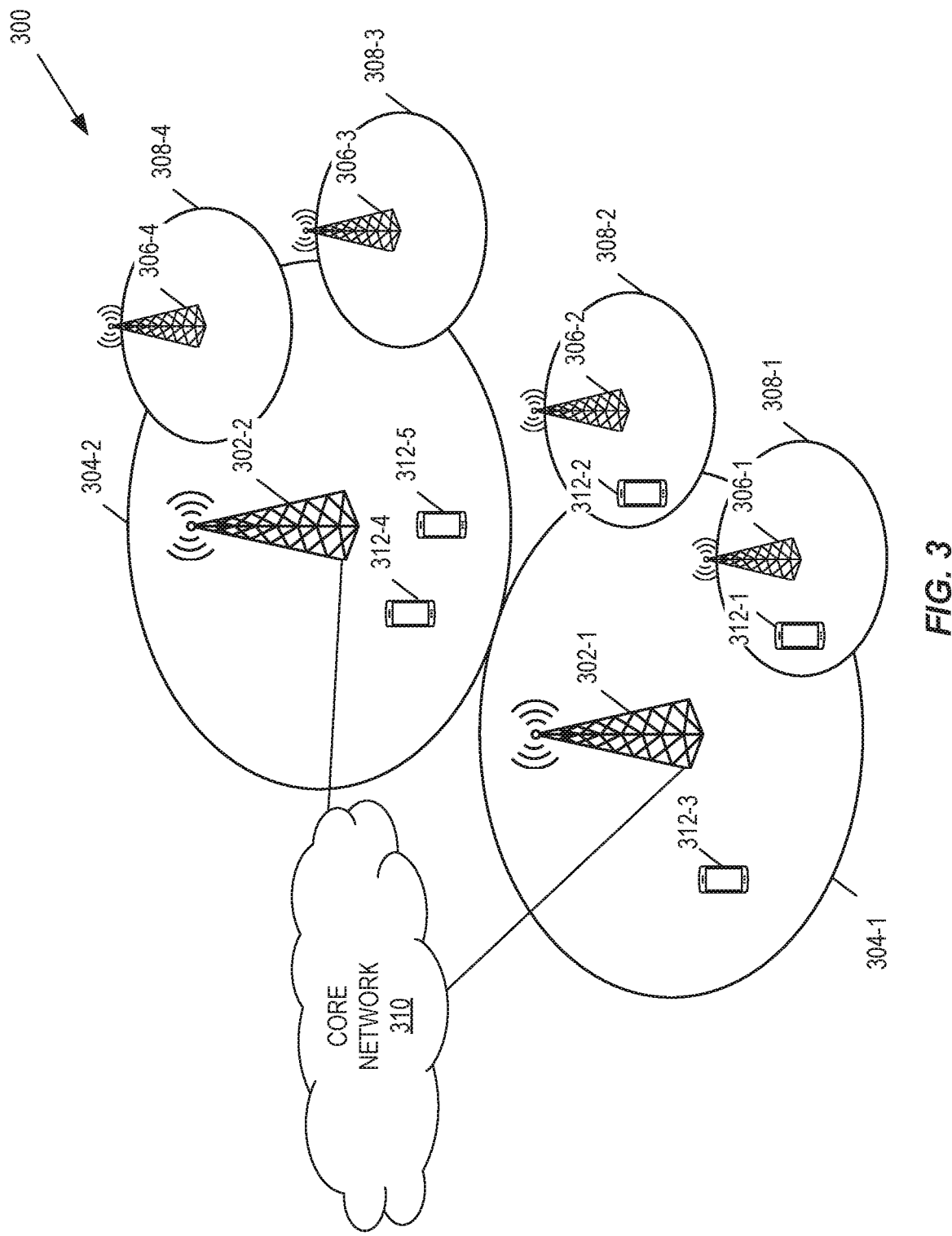
FIG. 3 illustrates one example of a cellular communications system 300 in which embodiments of the present disclosure may be implemented.

FIG. 3 illustrates one example of a cellular communications system 300 in which embodiments of the present disclosure may be implemented. In the embodiments described herein, the cellular communications system 300 may be a 5G system (5GS) including a NR RAN, an Evolved Packet System (EPS) including an LTE RAN, or a RAN that includes both 5GS and EPS components. In this example, the RAN includes base stations 302-1 and 302-2, which in LTE are referred to as eNBs and in 5G NR are referred to as gNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like.

Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G core (5GC). The base stations 302 (and optionally the low power nodes 306) are connected to the core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

Figure 4:
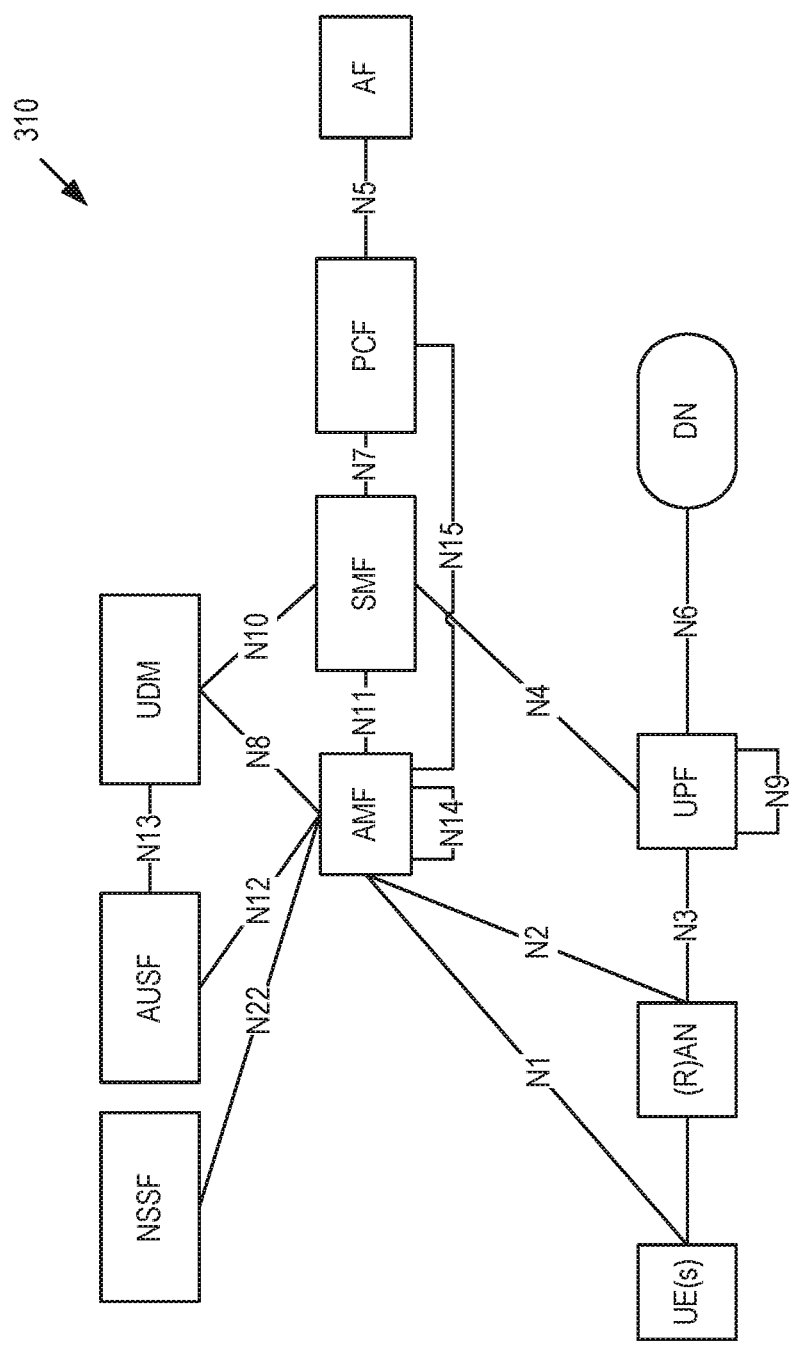
FIG. 4 illustrates a wireless communication system represented as a 5G network architecture composed of core Network Functions (NFs), where interaction between any two NFs is represented by a point-to-point reference point/interface.

FIG. 4 illustrates a wireless communication system represented as a 5G network architecture composed of core Network Functions (NFs), where interaction between any two NFs is represented by a point-to-point reference point/interface. FIG. 4 can be viewed as one particular implementation of the system 300 of FIG. 3.

Seen from the access side the 5G network architecture shown in FIG. 4 comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 4 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 4, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 4. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 5:
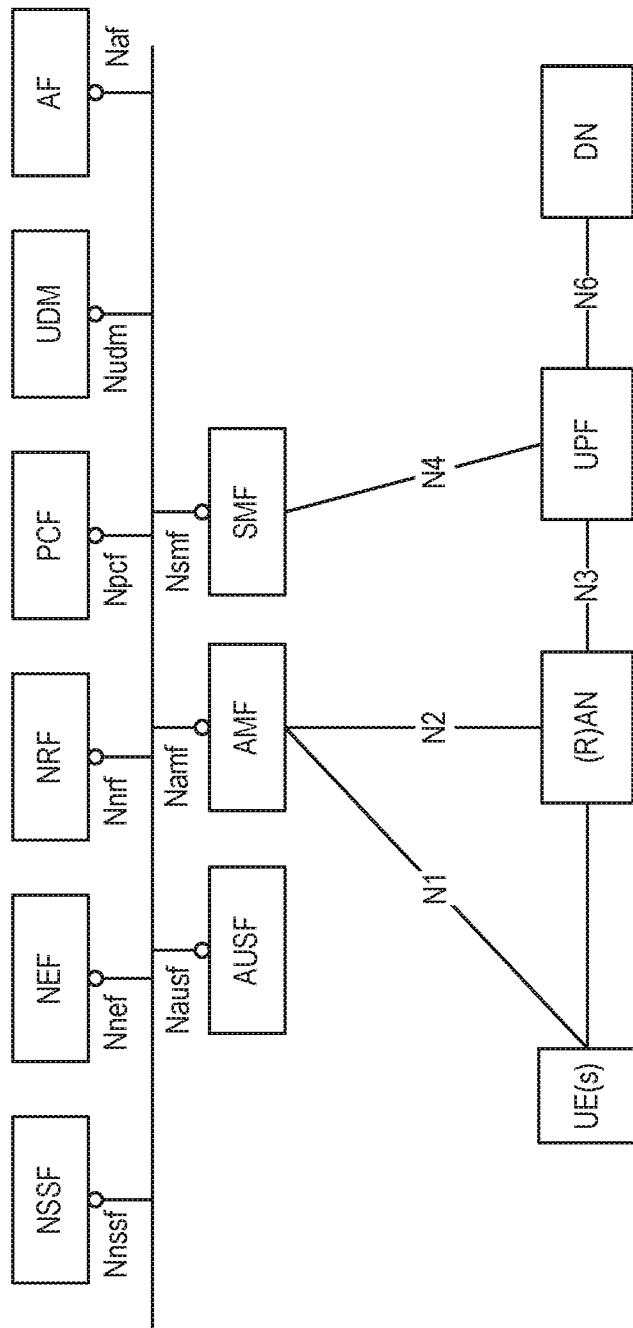
FIG. 5 illustrates a 5G network architecture using service-based interfaces between the NFs in the control plane, instead of the point-to-point reference points/interfaces used in the 5G network architecture of FIG. 4.

FIG. 5 illustrates a 5G network architecture using service-based interfaces between the NFs in the control plane, instead of the point-to-point reference points/interfaces used in the 5G network architecture of FIG. 4. However, the NFs described above with reference to FIG. 4 correspond to the NFs shown in FIG. 5. The service(s) etc. that a NF provides to other authorized NFs can be exposed to the authorized NFs through the service-based interface. In FIG. 5 the service based interfaces are indicated by the letter "N" followed by the name of the NF, e.g., Namf for the service based interface of the AMF and Nsmf for the service based interface of the SMF etc. The Network Exposure Function (NEF) and the Network Function (NF) Repository Function (NRF) in FIG. 5 are not shown in FIG. 4 discussed above. However, it should be clarified that all NFs depicted in FIG. 4 can interact with the NEF and the NRF of FIG. 5 as necessary, though not explicitly indicated in FIG. 4.

Some properties of the NFs shown in FIGS. 4 and 5 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

When a UE enters a cell which doesn't belong to its configured Tracking Area Identity (TAI) List and the UE connects to the EPC, this will trigger a Non-Access Stratum (NAS) TAU, by transmitting a TRACKING AREA UPDATE REQUEST (shown below from the 3GPP Technical Specification (TS) 24.301, Version 15.5.0) to the target MME, which can respond with a TRACKING AREA UPDATE Accept. In NR, a similar procedure is defined, called mobility registration update, where the UE instead sends a REGISTRATION UPDATE REQUEST.

There currently exist certain challenges. In RRC_INACTIVE state, at least one PDU Session has user plane resources, i.e., an N3 General Packet Radio Service (GPRS) Tunneling Protocol (GTP) User Plane (GTP-U) tunnel between the UPF terminating the N6 and a Next Generation (NG) Radio Access Network (RAN) terminating the N3 as well as associated DRBs established. This implies that any Mobile Terminated (MT) data is buffered or forwarded in or to NG-RAN and the AMF is unaware of that situation.

The NAS entity in the AMF and in the UE is in the Configuration Management (CM)-CONNECTED state. If the UE that is in the RRC_INACTIVE state moves from 5GS to EPS, the UE will perform a Tracking Area Update procedure that moves the UE Context from the old AMF to the new MME. However, there is no mechanism describing how user plane resources are managed. In scenarios where a UE is configured with a RAN Notification Area (RNA) comprising both LTE/EPC an NR cells, for example, there are no means to forward the data triggering the RAN paging in old NG-RAN to the UE connected to the eNB in EPS.

In some embodiments, when a UE in the CM-CONNECTED state with RRC inactive state in 5GS moves to EPS, the UE enters CM-IDLE mode. But the current interworking idle mode mobility procedure from 5GS to EPS does not cover the case CM-CONNECTED with RRC inactive where it is possible that there is data buffered in NG-RAN due to enhanced DRX (eDRX) in RRC inactive state.

Systems and methods for handling a wireless device in the CM-Connected state with RRC Inactive state are provided. In some embodiments, a method for performing a mobility transfer from a Fifth Generation (5G) network to an Evolved Packet System (EPS) network includes a 5G network node: receiving, from an EPS network node, a context request for context associated with a User Equipment (UE); determining data forwarding information associated with the UE; and sending, to the EPS network node, a context response comprising context information associated with the UE and data forwarding information associated with the UE. In this way, packet losses will be minimized leading to improved end user performance.

In some embodiments, a new 5GS to EPS idle mode mobility procedure is introduced with N26 interface for RRC inactive with data forwarding, following the data forwarding principle that exists in EPS (TS 23.401 clause 5.3.3.1A).

Trigger for data forwarding: In some embodiments, the methods described herein apply when a UE in the CM-CONNECTED state in 5GS and in the RRC_INACTIVE state in an NG-RAN enters the CM-IDLE state in LTE/EPC and triggers a NAS TAU in the EPS network in at least the following scenarios:
 (a) If the UE in the RRC_INACTIVE state is configured with a RAN Notification Area (RNA) having both LTE/EPC cells and NR cells, and if Mobile Terminated (MT) data arrives in the source gNB while the UE is camping on an LTE/EPC cell, then the network will initiate RAN paging over the Xn and X2 interfaces. When the UE receives the RAN page via an LTE/EPC cell, the UE will transition to the RRC_IDLE state and perform a NAS TAU in the EPS network; and
 (b) If the UE is in the RRC_INACTIVE state with Discontinuous Reception (DRX) or enhanced DRX (eDRX) activated—in which case the gNB may be buffering data for the UE, to be delivered to the UE when it wakes up during the DRX/eDRX active period—and if the UE reselects an LTE/EPC cell, then the UE will transition to the RRC_IDLE state and perform a NAS TAU in the EPS network.

Once the MME receives the TAU request, the MME will request the UE context from the old AMF by sending a Context Request message. Typically, the AMF is aware that the UE is in the CM-CONNECTED state and, when the AMF receives the Context Request message from the MME, the AMF then becomes aware that UE is in the RRC_INACTIVE state.

In some embodiments according to the present disclosure, the AMF then requests the gNB to report the state transition of the UE and the need of data forwarding information, and thereby retrieves the buffered data information from the gNB. In some embodiments, the AMF then retrieves the bearer context information from the SMF and/or UPF, and forwards that information to the MME in the Context Response message.

With this information, the MME then sets up the needed user plane resources and also a forwarding tunnel at the EPS side. In some embodiments, the MME then provides this information back to the AMF in the Context Acknowledge message. The AMF and/or the SMF can use this information to establish the forwarding channel between the 5GS network and the EPS network, e.g., between the 5GS gNB and/or UPF and EPS Serving Gateway (SGW) and/or eNB after receiving the Context Acknowledge message from the MME. In some embodiments, the AMF and/or SMF provides the gNB with the forwarding address of the involved entities (e.g., the eNB or the UPF), and the gNB forwards the buffered data directly to the target eNB or indirectly to the target eNB via the 5G UPF and/or the EPS SGW.

Figure 6:
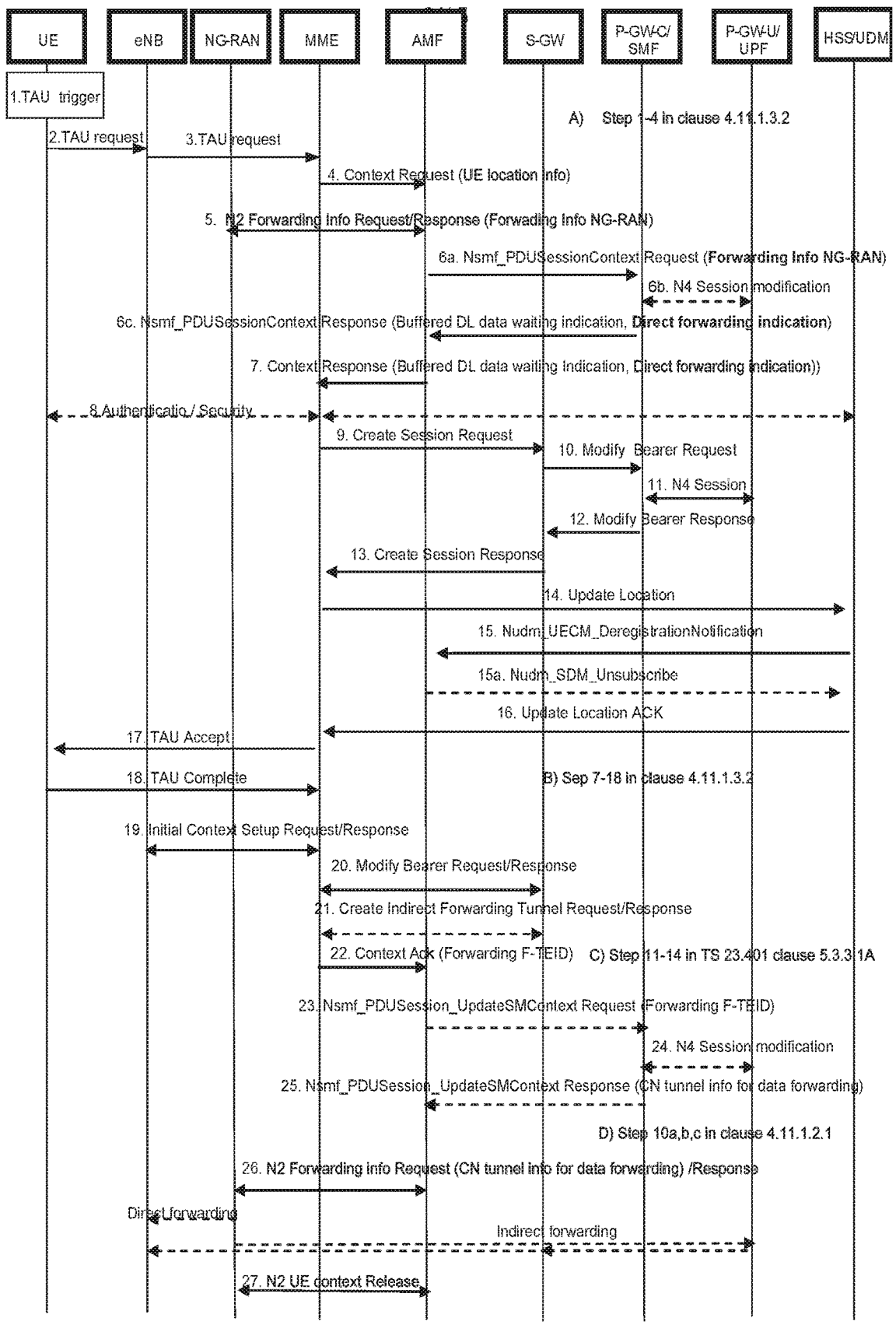
FIG. 6 illustrates a method for performing a mobility transfer from a 5G network to an EPS network according to some embodiments of the present disclosure.

The TAU procedure in RRC inactive with data forwarding: FIG. 6 illustrates a method for performing a mobility transfer from a 5G network to an EPS network according to some embodiments of the present disclosure. FIG. 6 is being proposed as a figure to be included in 3GPP TS 23.502; this figure is tentatively named "FIG. 4.11.1.3.x-1: 5GS to EPS Idle mode mobility using N26 interface with RRC inactive and data forwarding." The proposed changes/improvements over the prior art are shown in bold font in FIG. 6.

Below is a corresponding example procedure that will be proposed for TS 23.502 according to some embodiments of the present disclosure, for the data forwarding at 5GS to EPS Idle mode mobility with RRC_INACTIVE.

4.11.1.3.x 5GS to EPS Idle Mode Mobility Using N26 Interface with RRC Inactive and Data Forwarding.

In case of network sharing the UE selects the target Public Land Mobile Network (PLMN) ID according to clause 5.18.3 of TS 23.501 [2].

Clause 4.11.1.3.x covers the case of idle mode mobility from 5GC to EPC. UE performs Tracking Area Update procedure in E-UTRA/EPS when it moves from NG-RAN/5GS in the CM-CONNECTED state with RRC inactive state to E-UTRA/EPS coverage area.

The procedure involves a Tracking Area Update to EPC and setup of default EPS bearer and dedicated bearers in EPC in steps 1-11 and re-activation, if required.

1-4. Step 1-4 from clause 4.11.1.3.2 with following enhancement:
 In step 4 Context Request message, the MME may provide the current UE location info (i.e. the current TAI and eCGI from eNB in step 3)
 5. If UE is in the CM-CONNECTED state, the AMF retrieves data forwarding information from NG-RAN by sending N2 Data Forwarding Request message. The AMF indicates data forwarding target is E-UTRAN/EPC and the UE location info received in step 4 if it's received.

The NG-RAN provides data forwarding information (PDU Session IDs having buffered data, Direct forwarding availability, forwarding container), if there is data buffered for the UE. Furthermore, source NG-RAN includes information that assists target eNB management of that UE in a transparent manner. The NG-RAN use the UE location info to decide if direct or indirect forwarding shall be used.

Note: RAN3 decides the N2 messages between NG-RAN and AMF which can be enhancement of an existing message or new messages.

6a. Step 5a from clause 4.11.1.3.2 with the following enhancement:

The AMF includes also the data forwarding information from NG-RAN in step 5 to SMFs for the PDU Sessions indicated in step 4a.

6b. Step 5b from clause 4.11.1.3.2.

6c. Step 5c from clause 4.11.1.3.2 with the following enhancement:

The SMF includes the Buffered DL Data Waiting indication and Direct forwarding indication in the response based on the data forwarding information from NG-RAN in step 6a.

7. Step 6 from clause 4.11.1.3.2 with the following enhancement:

The AMF includes the indications received from SMFs above.

8-18. Steps 7-18 from clause 4.11.1.3.2

19-22. If the "Buffered DL data waiting indication" is set in step 6, the MME triggers steps 11-14 in clause 5.3.3.1A of TS 23.401 with the following enhancement:

If "Direct forwarding indication" is also set in step 8, the MME may skip step 21 and provide the eNB GTP-U tunnel information as Forwarding F-TEID in step 22 to AMF. Otherwise, MME provides the SGW GTP-U tunnel information received in step 21 as Forwarding F-TEID to AMF.

23-25. Steps 10a, 10b, 10c in clause 4.11.1.2.1 with the following enhancement:

If SMF receives eNB GTP-U tunnel information in the Forwarding F-TEID, the SMF and UPF may skip the allocation of the CN tunnel for data forwarding and provide the eNB GTP-U tunnel directly as the tunnel information for data forwarding if direct data forwarding is supported.

26. The AMF sends the tunnel information for data forwarding to NG-RAN in N2 forwarding Info message.

Note: RAN3 decides the N2 message between NG-RAN and AMF which can be enhancement of an existing message or new messages.

27. The AMF initiates the N2 UE context release procedure after the timer started in step 7 is expired.

Figure 7:
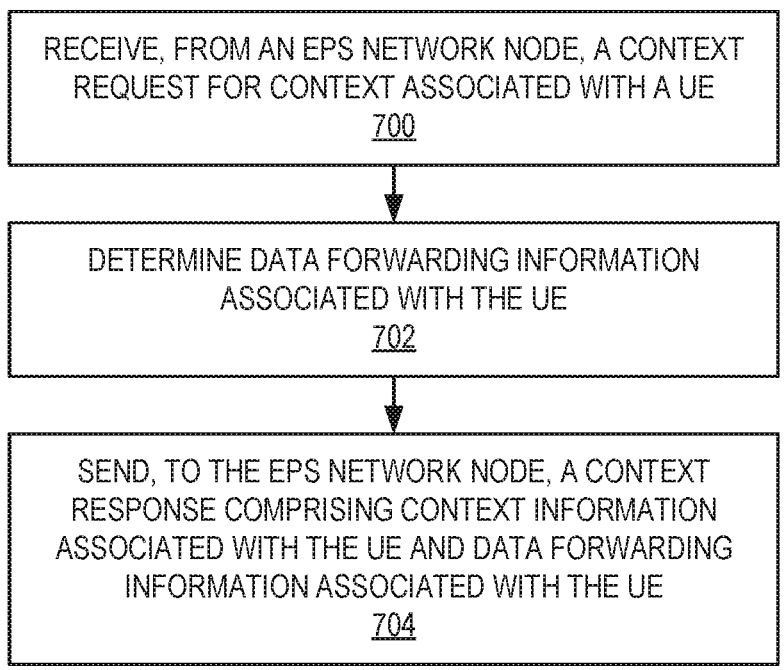
FIG. 7 is a flowchart illustrating an exemplary method for performing a mobility transfer from a 5G network to an EPS network according to some embodiments of the present disclosure.

FIG. 7 is a flowchart illustrating an exemplary method for performing a mobility transfer from a 5G network to an EPS network according to some embodiments of the present disclosure. FIG. 7 illustrates a method performed at a 5G network node, such as an AMF. In the embodiment illustrated in FIG. 7, the method includes the following steps. Step 700: receive, from an EPS network node, a context request for context associated with a UE. Step 702: determine data forwarding information associated with the UE. In some embodiments, this information is received from a SMF. In some embodiments, this information is received from a RAN node. Step 704: send, to the EPS network node, a context response comprising context information associated with the UE and data forwarding information associated with the UE.

Figure 8:
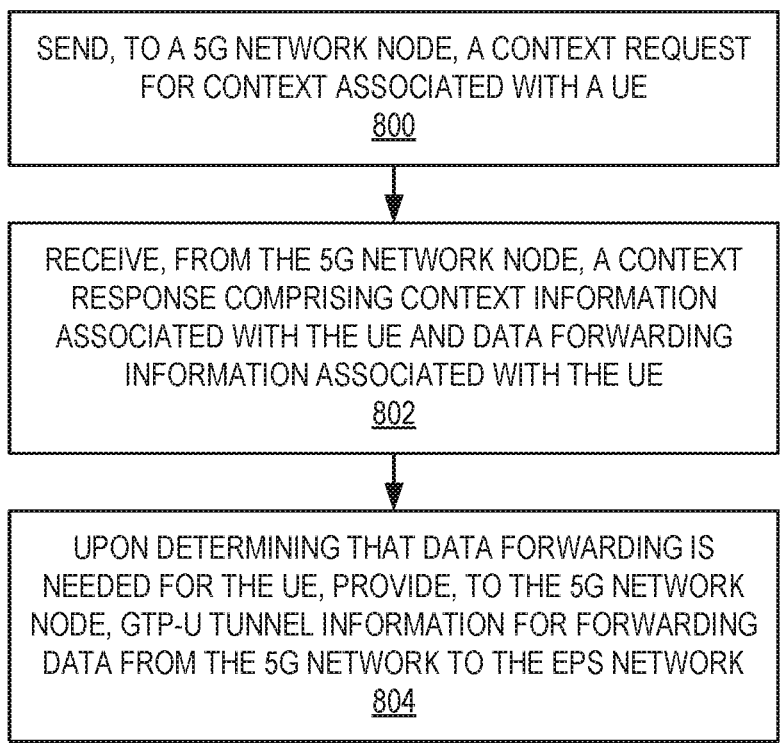
FIG. 8 is a flowchart illustrating an exemplary method for performing a mobility transfer from a 5G network to an EPS network according to some embodiments of the present disclosure.

FIG. 8 is a flowchart illustrating an exemplary method for performing a mobility transfer from a 5G network to an EPS network according to some embodiments of the present disclosure. FIG. 8 illustrates a method performed at an EPS network node, such as an MME. In the embodiment illustrated in FIG. 8, the method includes the following steps. Step 800: send, to a 5G network node, a context request for context associated with a UE. Step 802: receive, from the 5G network node, a context response comprising context information associated with the UE and also data forwarding information associated with the UE. Step 804: upon determining that data forwarding is needed for the UE, provide, to the 5G network node, GTP-U, tunnel information for forwarding data from the 5G network to the EPS network.

Figure 9:
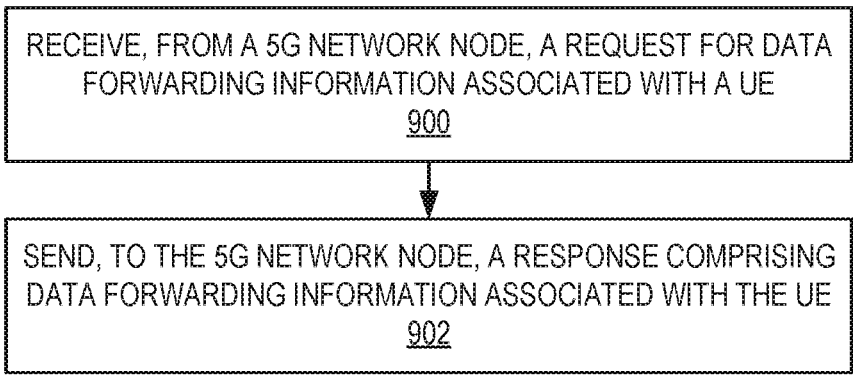
FIG. 9 is a flowchart illustrating an exemplary method for performing a mobility transfer from a 5G network to an EPS network according to some embodiments of the present disclosure.

FIG. 9 is a flowchart illustrating an exemplary method for performing a mobility transfer from a 5G network to an EPS network according to some embodiments of the present disclosure. FIG. 9 illustrates a method performed at NG-RAN network node, such as a gNB. In the embodiment illustrated in FIG. 9, the method includes the following steps. Step 900: receive, from a 5G network node, a request for data forwarding information associated with a UE. Step 902: send, to the 5G network node, a response comprising data forwarding information associated with the UE.

Figure 10:
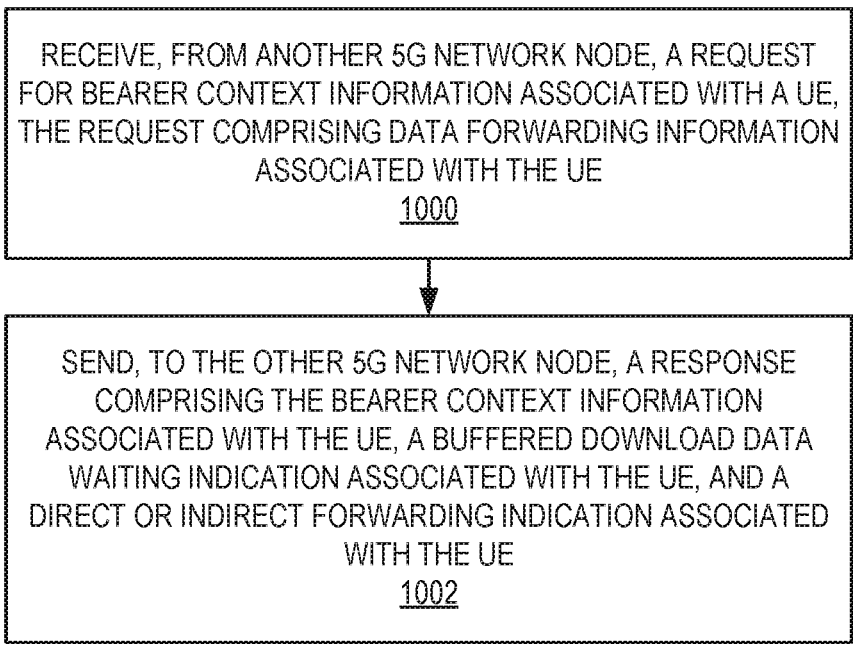
FIG. 10 is a flowchart illustrating an exemplary method for performing a mobility transfer from a 5G network to an EPS network, according to some embodiments of the present disclosure.

FIG. 10 is a flowchart illustrating an exemplary method for performing a mobility transfer from a 5G network to an EPS network according to some embodiments of the present disclosure. FIG. 9 illustrates a method performed at 5G network node, such as an SMF. In the embodiment illustrated in FIG. 10, the method includes the following steps. Step 1000: receive, from a second 5G network node, such as an AMF, a request for bearer context information associated with the UE, the request comprising data forwarding information associated with the UE. Step 1002: send, to second 5G network node, a response comprising the bearer context information associated with the UE, a buffered download data waiting indication associated with the UE, and a direct or indirect forwarding indication associated with the UE.

Figure 11:
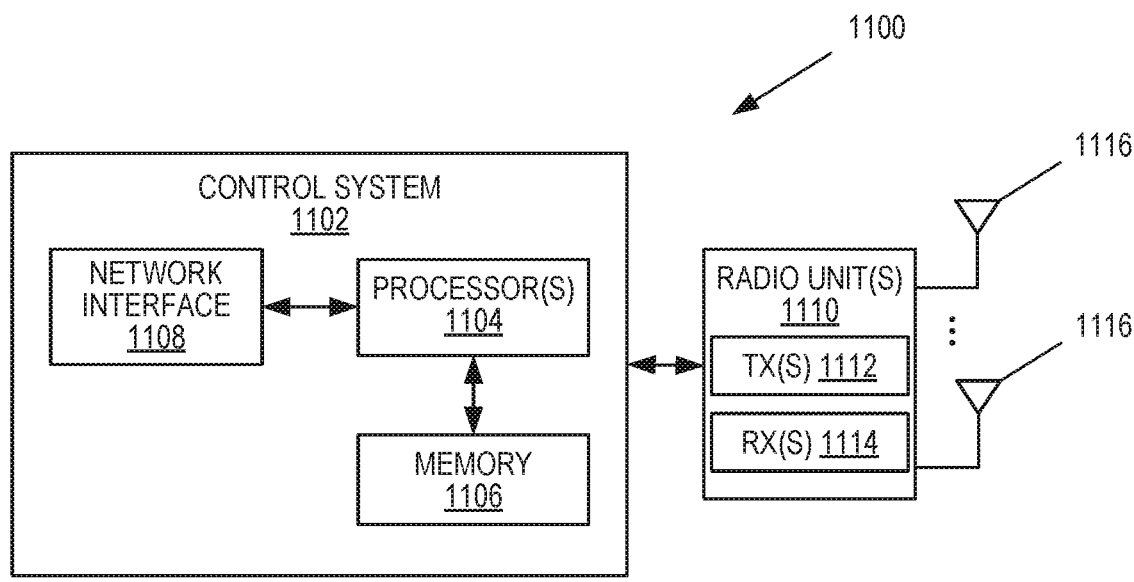
FIG. 11 illustrates one embodiment of a User Equipment (UE), according to some embodiments of the present disclosure.

FIG. 11 is a schematic block diagram of a radio access node 1100 according to some embodiments of the present disclosure. The radio access node 1100 may be, for example, a base station 302 or 306. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
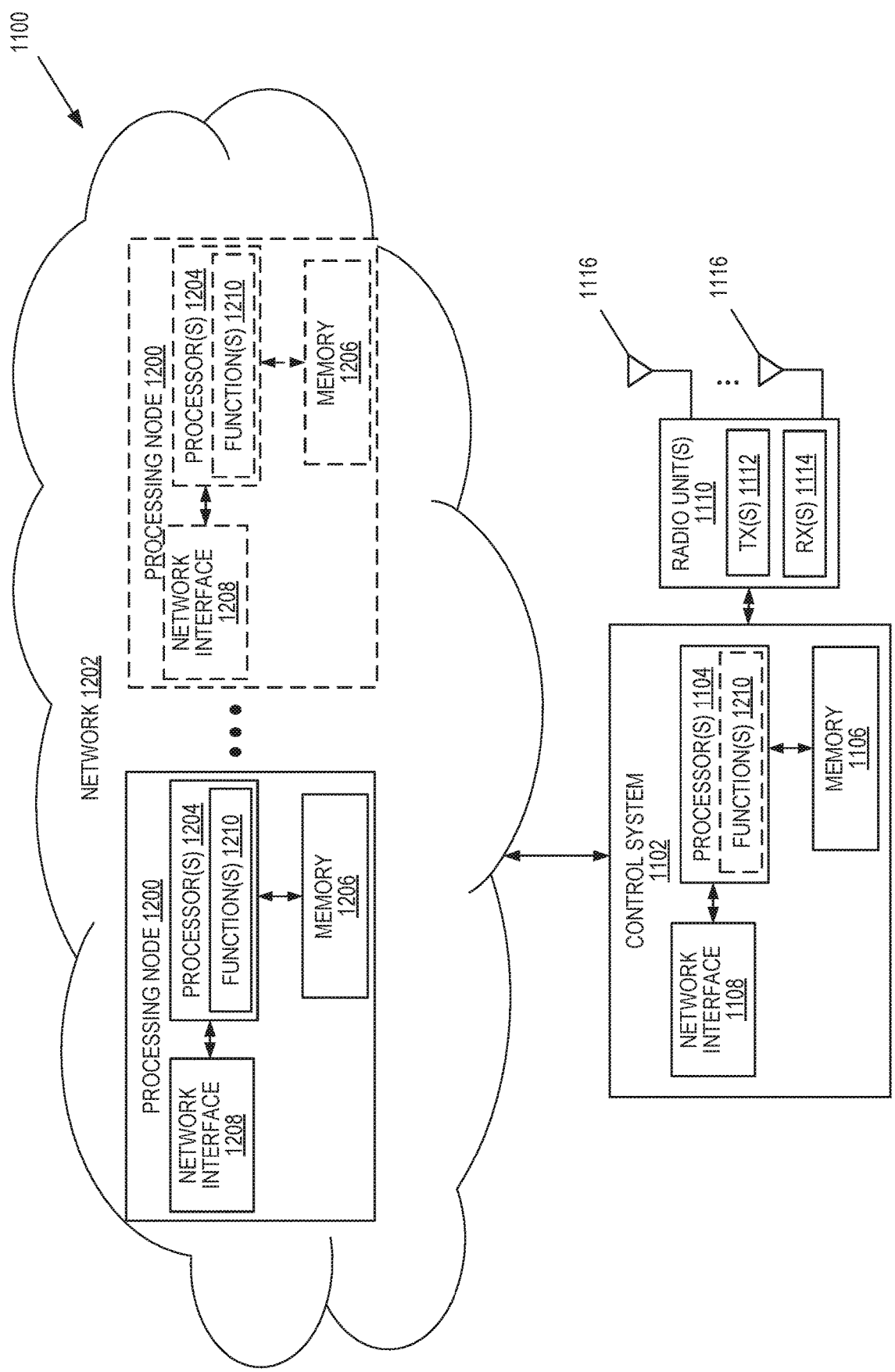
FIG. 12 is a schematic block diagram illustrating a virtualization environment in which functions implemented by some embodiments may be virtualized, according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 includes the control system 1102 that includes the one or more processors 1104 (e.g., CPUs, ASICs, FPGAs, and/or the like), the memory 1106, and the network interface 1108 and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the control system 1102 and the one or more processing nodes 1200 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
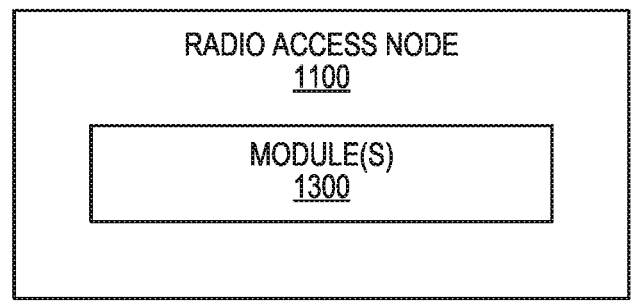
FIG. 13 illustrates an exemplary communication system, according to some embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
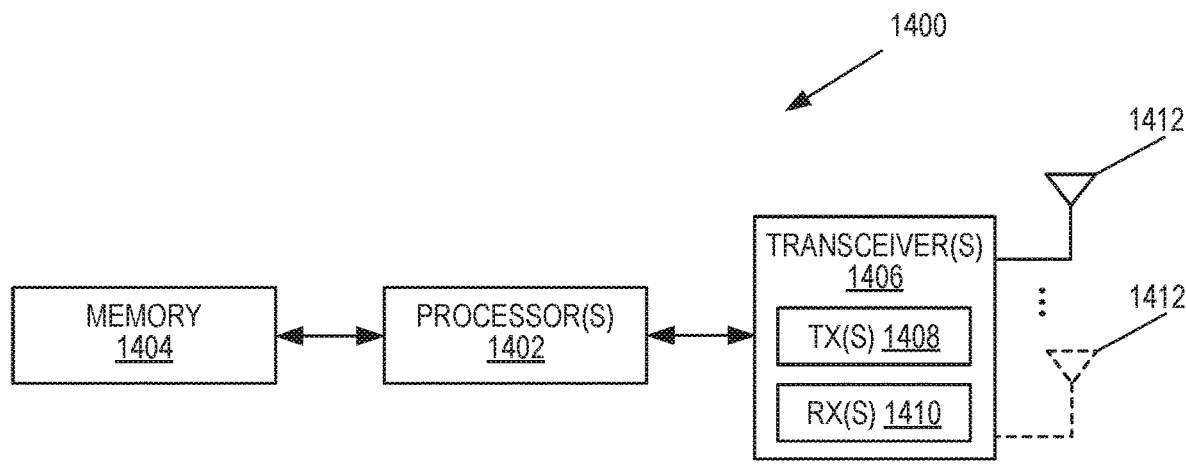
FIG. 14 illustrates example implementations, in accordance with an embodiment, of the UE, base station, and host computer of FIG. 13, according to some embodiments of the present disclosure.

FIG. 14 is a schematic block diagram of a UE 1400 according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the UE 1400 described above may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
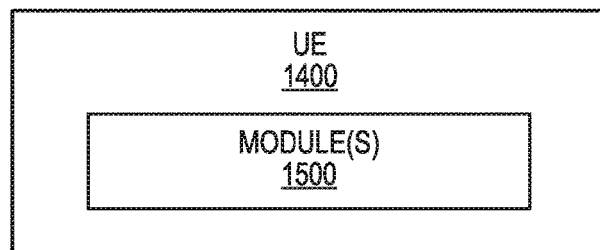

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein.

Figure 16:
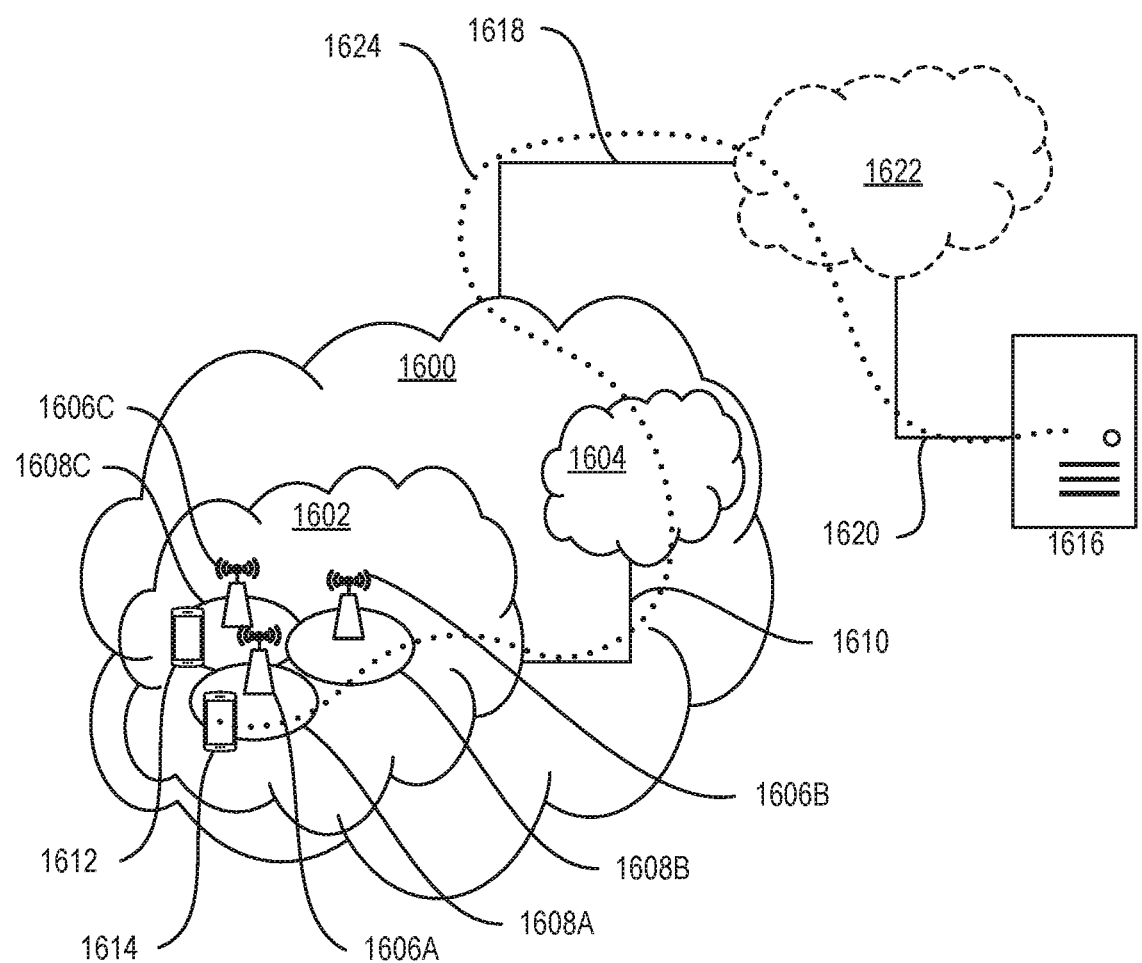

FIG. 16 illustrates a communication system according to some embodiments of the present disclosure. With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as NBs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Figure 17:
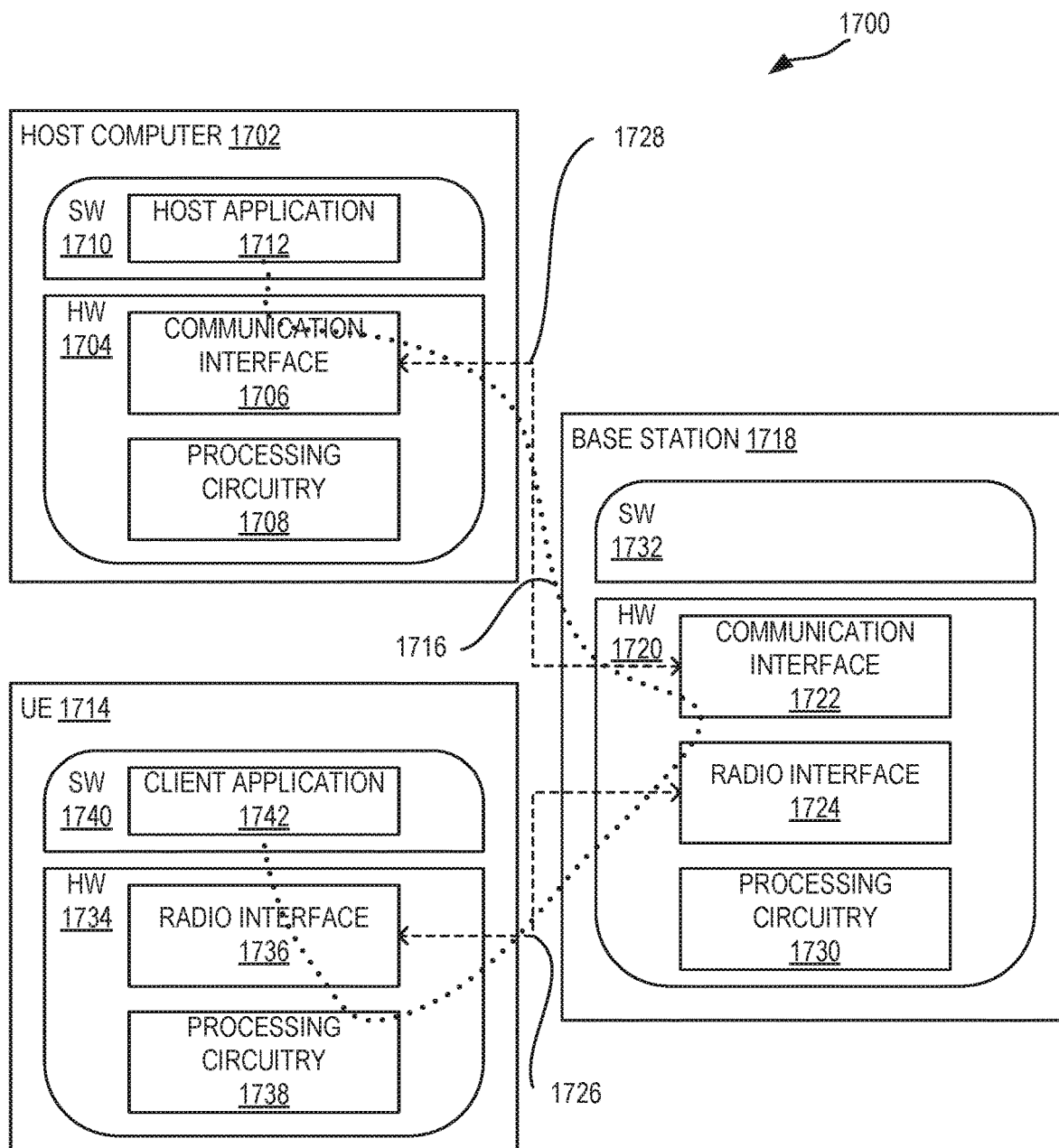

FIG. 17 illustrates a communication system according to some embodiments of the present disclosure. Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment. More precisely, the teachings of these embodiments enables the EPS bearer setup required for downlink data forwarding when a UE performs a TAU request at idle mode mobility towards an EPS and there is data available at the source system and thereby provide benefits such as minimizing packet loss, which leads to improved end-user performance.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments—5G AMF

Embodiment 1: A method for performing a mobility transfer from a Fifth Generation, 5G, network to an Evolved Packet System, EPS, network, the method comprising: at a 5G network node: receiving, from an EPS network node, a context request for context associated with a User Equipment, UE; determining, from a Next Generation, NG, Radio Access Network, RAN, NG-RAN, data forwarding information associated with the UE; and sending, to the EPS network node, a context response comprising context information associated with the UE and also the data forwarding information associated with the UE.

Embodiment 2: The method of embodiment 1 wherein the 5G network node comprises an Access and Mobility Management Function, AMF.

Embodiment 3: The method of embodiment 1 or 2 wherein the EPS network node comprises a Mobility Management Entity, MME.

Embodiment 4: The method of any of embodiments 1-3 wherein the context request comprises current UE location information.

Embodiment 5: The method of embodiment 4 wherein the current UE location information comprises at least one of: a current Tracking Area Identity, TAI; and an Evolved Universal Terrestrial Radio Access Network, E-UTRAN, Cell Global identifier, eCGI.

Embodiment 6: The method of any of embodiments 1-5 wherein determining the data forwarding information comprises: sending, to a 5G Node B, gNB, within the NG-RAN, a first request for data forwarding information associated with the UE; receiving, from the gNB, a first response comprising data forwarding information associated with the UE; sending, to a Session Management Function, SMF, and/or a User Plane Function, UPF, a second request for bearer context information associated with the UE, the second request comprising the data forwarding information associated with the UE; and receiving, from the SMF and/or UPF, a second response comprising the bearer context information associated with the UE, a buffered download data waiting indication associated with the UE, and a direct or indirect forwarding indication associated with the UE; and wherein sending the data forwarding information comprises sending the buffered download data waiting indication and the direct or indirect forwarding indication.

Embodiment 7: The method of embodiment 6 wherein the first request comprises a N2 Data Forwarding Information Request message and the first response comprises a N2 Data Forwarding Information Response message.

Embodiment 8: The method of embodiment 6 or 7 wherein the data forwarding information associated with the UE comprises at least one of: a Protocol Data Unit, PDU, session Identifier, ID, having buffered data; a direct or indirect forwarding indication; and information identifying a forwarding container.

Embodiment 9: The method of embodiment 8 wherein the second request comprises a Nsmf_PDUSessionContext Request message and the second response comprises a Nsmf_PDUSessionContext Response message.

Embodiment 10: The method of embodiment 6 or 9 wherein direct forwarding is indicated by the presence of a direct forwarding indicator in the second response and wherein indirect forwarding is indicated by the absence of a direct forwarding indicator in the second response.

Embodiment 11: The method of any of embodiments 1-10, further comprising: receiving, from the EPS node, a context acknowledgment that comprises General Packet Radio Service, GPRS, Tunneling Protocol, GTP, User Plane, GTP-U, tunnel information; and sending the GTP-U tunnel information to the NG-RAN.

Embodiment 12: The method of embodiment 11 wherein receiving the GTP-U tunnel information comprises receiving a forwarding Fully-qualified Tunnel Endpoint Identifier, F-TEID.

Embodiment 13: The method of embodiment 11 or 12 wherein sending the GTP-U tunnel information to the NG-RAN comprises sending an N2 Forwarding Information Request message comprising the GTP-U tunnel information.

Group B Embodiments—EPS MME

Embodiment 14: A method for performing a mobility transfer from a Fifth Generation, 5G, network to an Evolved Packet System, EPS, network, the method comprising: at an EPS network node: sending, to a 5G network node, a context request for context associated with a User Equipment, UE; receiving, from the 5G network node, a context response comprising context information associated with the UE and also data forwarding information associated with the UE; and upon determining that data forwarding is needed for the UE, providing, to the 5G network node, General Packet Radio Service, GPRS, Tunneling Protocol, GTP, User Plane, GTP-U, tunnel information for forwarding data from the 5G network to the EPS network.

Embodiment 15: The method of embodiment 14 wherein the EPS network node comprises a Mobility Management Entity, MME.

Embodiment 16: The method of embodiment 14 or 15 wherein the 5G network node comprises an Access and Mobility Management Function, AMF.

Embodiment 17: The method of any of embodiments 14-16 wherein the context request comprises current UE location information.

Embodiment 18: The method of embodiment 17 wherein the current UE location information comprises at least one of: a current Tracking Area Identity, TAI; and an Evolved Universal Terrestrial Radio Access Network, E-UTRAN, Cell Global identifier, eCGI.

Embodiment 19: The method of any of embodiments 14-18 wherein the data forwarding information comprises at least one of: a buffered download data waiting indication associated with the UE; and a direct or indirect forwarding indication.

Embodiment 20: The method of embodiment 19 wherein direct forwarding is indicated by the presence of a direct forwarding indicator and wherein indirect forwarding is indicated by the absence of a direct forwarding indicator.

Embodiment 21: The method of any of embodiments 14-20 wherein providing the GTP-U tunnel information for forwarding data from the 5G network to the EPS network comprises providing a forwarding Fully-qualified Tunnel Endpoint Identifier, F-TEID.

Embodiment 22: The method of any of embodiments 14-21 wherein providing the GTP-U tunnel information for forwarding data from the 5G network to the EPS network comprises sending an N2 Forwarding Information Request message comprising the GTP-U tunnel information.

Group C Embodiments—N5 NG-RAN

Embodiment 23: A method for performing a mobility transfer from a Fifth Generation, 5G, network to an Evolved Packet System, EPS, network, the method comprising: at a Next Generation, NG, Radio Access Network, RAN, node: receiving, from a 5G network node, a request for data forwarding information associated with a User Equipment, UE; and sending, to the 5G network node, a response comprising data forwarding information associated with the UE.

Embodiment 24: The method of embodiment 23 wherein the request for data forwarding information associated with the UE comprises current UE location information.

Embodiment 25: The method of embodiment 24 wherein the current UE location information comprises at least one of: a current Tracking Area Identity, TAI; and an Evolved Universal Terrestrial Radio Access Network, E-UTRAN, Cell Global identifier, eCGI.

Embodiment 26: The method of any of embodiments 23-25 wherein the request comprises a N2 Data Forwarding Information Request message and the response comprises a N2 Data Forwarding Information Response message.

Embodiment 27: The method of any of embodiments 23-27 wherein the data forwarding information associated with the UE comprises at least one of: a Protocol Data Unit, PDU, session Identifier, ID, having buffered data; a direct or indirect forwarding indication; and information identifying a forwarding container.

Group D Embodiments—5G SMF

Embodiment 28: A method for performing a mobility transfer from a Fifth Generation, 5G, network to an Evolved Packet System, EPS, network, the method comprising: at a first 5G network node: receiving, from a second 5G network node, a request for bearer context information associated with the UE, the request comprising data forwarding information associated with the UE; and sending, to second 5G network node, a response comprising the bearer context information associated with the UE, a buffered download data waiting indication associated with the UE, and a direct or indirect forwarding indication associated with the UE.

Embodiment 29: The method of embodiment 28 wherein the first 5G network node comprises a Session Management Function, SMF.

Embodiment 30: The method of embodiment 28 or 29 wherein the second 5G network node comprises an Access and Mobility Management Function, AMF.

Embodiment 31: The method of any of embodiments 28-30 wherein the request comprises a Nsmf_PDUSession-Context Request message and the response comprises a Nsmf_PDUSessionContext Response message.

Embodiment 32: The method of any of embodiments 28-31 wherein direct forwarding is indicated by the presence of a direct forwarding indicator in the response and wherein indirect forwarding is indicated by the absence of a direct forwarding indicator in the response.

Group E Embodiments—Apparatus

Embodiment 33: A Fifth Generation, 5G, network node for performing a mobility transfer from a 5G network to an Evolved Packet System, EPS, network, the 5G network node comprising: processing circuitry configured to perform any of the steps of any of the Group A, Group C, or Group D embodiments; and power supply circuitry configured to supply power to the 5G network node.

Embodiment 34: The 5G network node of embodiment 33, the 5G network node comprising an Access and Mobility Management Function, AMF, node.

Embodiment 35: The 5G network node of embodiment 33, the 5G network node comprising a Session Management Function, SMF, node.

Embodiment 36: The 5G network node of embodiment 33, the 5G network node comprising a User Plane Function, UPF, node.

Embodiment 37: The 5G network node of embodiment 33, the 5G network node comprising a Next Generation, NG, Radio Access Network, RAN, node.

Embodiment 38: The NG-RAN node of embodiment 37, the NG-RAN node comprising a New Radio, NR, Node B, gNB.

Embodiment 39: An Evolved Packet System, EPS, network node for performing a mobility transfer from a Fifth Generation, 5G, network to an EPS network, the EPS network node comprising: processing circuitry configured to perform any of the steps of any of the Group B embodiments; and power supply circuitry configured to supply power to the EPS network node.

Embodiment 40: The EPS network node of embodiment 39, the EPS network node comprising a Mobility Management Entity, MME.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
    5G Fifth Generation
    5GC Fifth Generation Core network
    5GS Fifth Generation System
    AF Application Function
    AMF Access and Mobility Management Function
    AN Access Network
    AP Access Point
    ASIC Application Specific Integrated Circuit
    AUSF Authentication Server Function
    CGI Cell Global Identifier
    CM Configuration Management
    CN Core Network
    CPU Central Processing Unit
    DL Downlink
    DN Data Network
    DRB Data Radio Bearer
    DRX Discontinuous Reception
    DSP Digital Signal Processor
    eCGI Evolved Universal Terrestrial Radio Access Network (E-UTRAN) Cell Global Identifier
    eDRX Enhanced Discontinuous Reception
    eNB Enhanced or Evolved Node B
    EPC Evolved Packet Core
    EPS Evolved Packet System
    E-UTRA Evolved Universal Terrestrial Radio Access
    E-UTRAN Evolved Universal Terrestrial Radio Access Network
    FPGA Field Programmable Gate Array
    F-TEID Fully-qualified Tunnel Endpoint Identifier
    gNB New Radio Base Station
    GPRS General Packet Radio Service
    GTP General Packet Radio Service Tunneling Protocol
    GTP-U General Packet Radio Service Tunneling Protocol, User data
    HSS Home Subscriber Server
    ID Identifier/Identity
    IP Internet Protocol
    I-RNTI Inactive mode Radio Network Temporary Identifier LTE Long Term Evolution
MME Mobility Management Entity
MT Mobile-Terminated
MTC Machine Type Communication
NAS Non-Access Stratum
NEF Network Exposure Function
NF Network Function
NG Next Generation (e.g., 5G)
NR New Radio
NRF Network Function Repository Function
NSSF Network Slice Selection Function
OTT Over-the-Top
PCF Policy Control Function
PDU Protocol Data Unit
PGW Packet Gateway
PLMN Public Land Mobile Network
QoS Quality of Service
RAM Random Access Memory
RAN Radio Access Network
RAT Radio Access Technology
RNA Radio Access Network Notification Area
RNTI Radio Network Temporary Identifier
ROM Read Only Memory
RRC Radio Resource Control
RRH Remote Radio Head
RTT Round Trip Time
SCEF Service Capability Exposure Function
SGW Serving Gateway
SMF Session Management Function
TAI Tracking Area Identity
TAU Tracking Area Update
TEID Tunnel Endpoint Identifier
TS Technical Specification
UDM Unified Data Management
UE User Equipment
UPF User Plane Function
UTRA Universal Terrestrial Radio Access
UTRAN Universal Terrestrial Radio Access Network Those skilled in the art will recognize improvements and modifications to the embodiments of the present disclosure. All such improvements and modifications are considered within the scope of the concepts disclosed herein.

What is claimed is:

1. A method performed by a Fifth Generation (5G) network entity for performing a mobility transfer from a 5G network to an Evolved Packet System (EPS) network, the method comprising:
   receiving, from an EPS network entity, a context request for context associated with a User Equipment (UE);
   determining data forwarding information associated with the UE;
   sending, to the EPS network entity, a context response comprising context information associated with the UE and the data forwarding information associated with the UE;
   receiving, from the EPS network entity, a context acknowledgment that comprises General Packet Radio Service (GPRS) Tunneling Protocol (GTP), User Plane (GTP-U) tunnel information; and
   sending the GTP-U tunnel information to a Next Generation-Radio Area Network (NG-RAN).

2. The method of claim 1 wherein the 5G network entity comprises an Access and Mobility Management Function (AMF) implemented on a node, and the EPS network entity comprises a Mobility Management Entity (MME) implemented on the node.

3. The method of claim 1 wherein the context request comprises current UE location information, and the current UE location information comprises at least one of:
   a current Tracking Area Identity (TAI); and
   an Evolved Universal Terrestrial Radio Access Network (E-UTRAN), Cell Global Identifier (eCGI).

4. The method of claim 1 wherein determining the data forwarding information associated with the UE comprises:
   receiving an indication from a Session Management Function (SMF) regarding the data forwarding information associated with the UE.

5. The method of claim 1 wherein determining the data forwarding information comprises:
   sending, to a 5G Node B (gNB) within the NG-RAN, a first request for the data forwarding information associated with the UE;
   receiving, from the gNB, a first response comprising the data forwarding information associated with the UE;
   sending, to the SMF and/or a User Plane Function (UPF, a second request for bearer context information associated with the UE, the second request comprising the data forwarding information associated with the UE; and
   receiving, from the SMF and/or the UPF, a second response comprising the bearer context information associated with the UE, a buffered download data waiting indication associated with the UE, and a direct or indirect forwarding indication associated with the UE; and
   wherein sending the data forwarding information comprises sending the buffered download data waiting indication and the direct or indirect forwarding indication.

6. The method of claim 5 wherein the first request comprises an N2 Data Forwarding Information Request message and the first response comprises an N2 Data Forwarding Information Response message.

7. The method of claim 5 wherein the data forwarding information associated with the UE comprises at least one of:
   a Protocol Data Unit (PDU) session Identifier (ID) having buffered data;
   the direct or indirect forwarding indication; and
   information identifying a forwarding container.

8. The method of claim 7 wherein the second request comprises an Nsmf_PDUSessionContext Request message and the second response comprises an Nsmf_PDUSessionContext Response message.

9. The method of claim 5 wherein direct forwarding is indicated by the presence of a direct forwarding indicator in the second response and wherein indirect forwarding is indicated by the absence of a direct forwarding indicator in the second response.

10. The method of claim 1 wherein receiving the GTP-U tunnel information comprises receiving a forwarding Fully-qualified Tunnel Endpoint Identifier (F-TEID).

11. The method of claim 1 wherein sending the GTP-U tunnel information to the NG-RAN comprises sending the N2 Forwarding Information Request message comprising the GTP-U tunnel information.

* * * * *